United States Patent [19]

Varney

[11] Patent Number: 4,897,999

[45] Date of Patent: Feb. 6, 1990

[54] STEAM POWER PLANT

[76] Inventor: John W. Varney, P.O. Box 676, Cornwall, P. E. I., Canada, C0A 1H0

[21] Appl. No.: 305,612

[22] Filed: Feb. 3, 1989

[51] Int. Cl.⁴ .............................................. F01K 7/34
[52] U.S. Cl. ......................................... 60/678; 60/670
[58] Field of Search ......................... 60/670, 677, 678

[56] References Cited

U.S. PATENT DOCUMENTS

| | | | |
|---|---|---|---|
| 1,656,985 | 1/1928 | Monroe | 60/678 |
| 3,032,999 | 5/1962 | Pacault | 60/678 |
| 3,835,650 | 9/1974 | Chesmejef | 60/670 X |
| 3,913,331 | 10/1975 | Conwell | 60/670 |

Primary Examiner—Allen M. Ostrager
Attorney, Agent, or Firm—McConnell and Fox

[57] ABSTRACT

In a multi-stage steam power plant a portion of the bleed steam is passed through a heat exchanger in the combustion air input duct to preheat the combustion air. The condenser output water is also passed through a heat exchanger in the combustion air input duct and then, before returning to the boiler feed water line, is passed through a heat exchanger in the flue and then a further heat exchanger in the air input duct. In this way heat from the condensate is retained in the system and heat from the flue gas is returned to the intake combustion air.

5 Claims, 1 Drawing Sheet

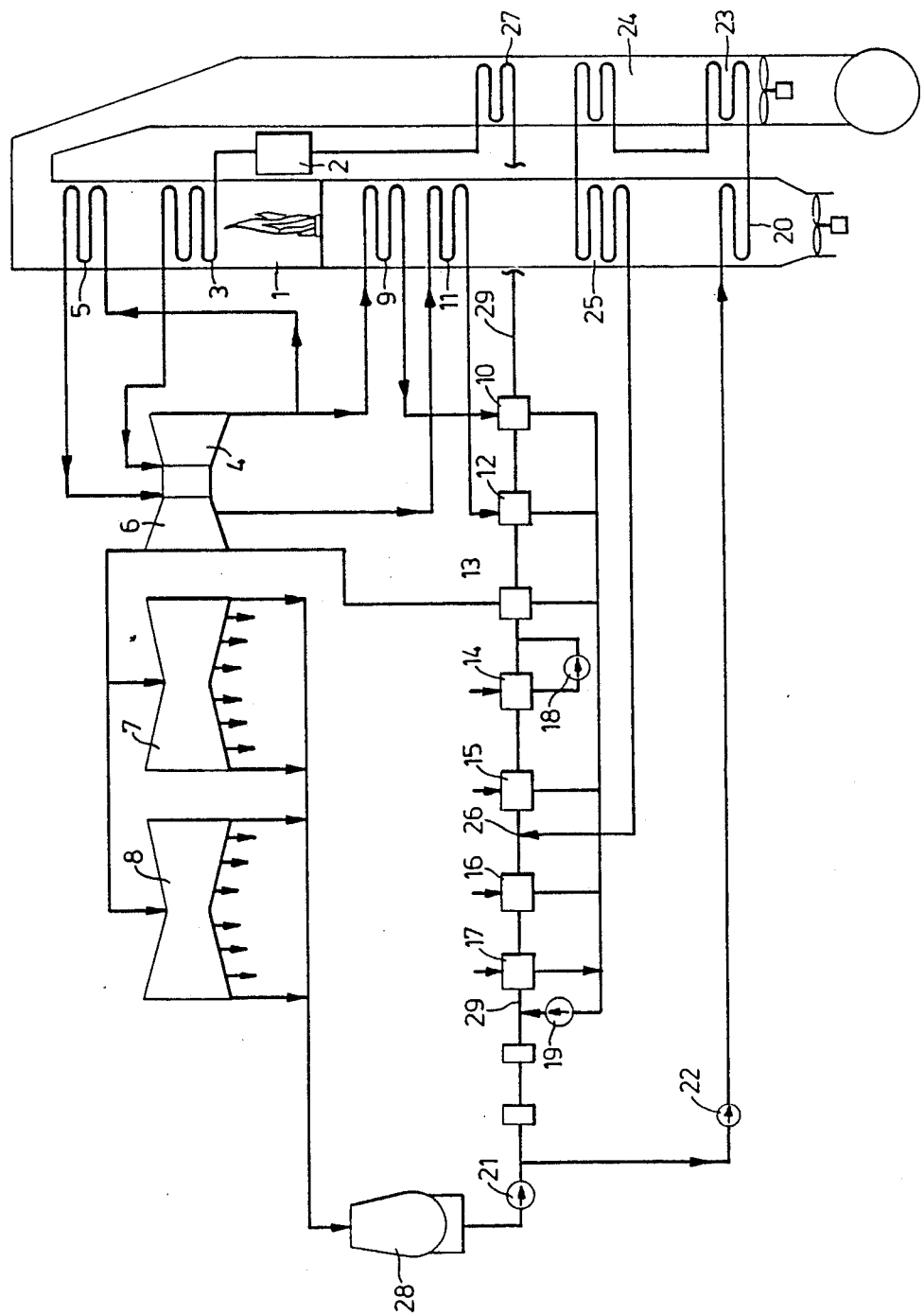

STEAM POWER PLANT

FIELD OF THE INVENTION

This invention relates to steam turbine power plants and, in particular, to multi-stage power plants having high, intermediate and low pressure steam turbines.

DESCRIPTION OF THE PRIOR ART

It is conventional in multi-stage steam power plants to bleed off a portion of the steam from various stages of the turbines. These bleeds increase the percentage of usefully condensed steam, (i.e. steam which in condensing returns all its heat to the system) and improve system efficiency. Steam condensed with the heat retained in the system will always yield greater efficiency than steam expanded and cooled to derive mechanical energy. It is conventional to utilize the bleed steam through suitable heat exchangers to preheat the condensate before reintroduction to the steam generator. It is evident that the more heat than can be retained in the system, either by introducing it back into the combustion process or by introducing it into the water feed, the more efficient the system will become. It will be evident, however, that every heat exchanger required in the system will add to the cost and heat exchangers subject to high pressure, such as feed pump pressure, will add substantially to the cost. It will also be evident that the more heat that can be extracted from the flue gases and the lower the temperature of the flue gases the more efficient the system will be.

It is the purpose of this invention to improve the efficiency of a steam power plant without concurrently increasing the cost of the heat exchangers.

A clearer understanding of my invention may be had from a consideration of FIG. 1 which is a system diagram of a multi-stage steam turbine power plant incorporating my invention.

DESCRIPTION OF THE PREFERRED EMBODIMENT

As will be seen, the steam power plant consists of a furnace 1 whose steam output is separated in steam separator 2, superheated in superheater 3 and supplied to high pressure turbine 4. The output steam from turbine 4 is passed through reheater 5 to the intermediate pressure turbine 6. The steam output from turbine 6 is applied to two low pressure turbines 7 and 8. It will be seen that a portion of the steam from high pressure turbine 4 is applied to air preheater coil 9 and to heat exchanger 10. The air preheater coil 9 is in the furnace air input duct and heater exchanger 10 is coupled to the water return line to the steam generator. A portion of the steam from the intermediate pressure turbine 6 from an intermediate stage is passed through air preheater coil 11 and heat exchanger 12 which similarly are located in the air input duct for furnace 1 and the condensate return line to the steam separator. Coil 11 is upstream of coil 9. The output from the intermediate pressure turbine 6 as well as being fed to the low pressure turbine 7 and 8 is also fed to a heat exchanger 13 in the condensate return line. A number of heat exchangers 14, 15, 16 and 17 are fed from various points in intermediate stages of the low pressure turbines 7 and 8. The condensate from heat exchangers 10, 12 and 13 is collected and returned to the input side of the boiler water feed pump. The condensate from condensers 14, 15, 16 and 17 is returned through a drain pump 19 to the boiler feed water line.

To this point, the system is largely conventional, except for heat exchangers which preheat the combustion air. These heat exchangers include the first air preheat heat exchanger 20 which takes a portion of the water directly from the condensate pump 21 which is always slightly above ambient and, by means of the coil booster pump 22, this water is pumped through the preheat coil 20. Coil 20 is at the inlet of duct 1. From the preheat coil 20 the water flows through the heat exchanger 23 at the output of the stack and heat exchanger 24 also in the stack, upstream of heat exchanger 23, which take the remnant heat in the flue gases and use it to preheat the condensate. A portion of this heat is extracted from the condensate feed water by heat exchanger 25 in the furnace air supply duct between coil 11 and coil 20 and the water is then returned to the boiler feed water line at point 26. In addition, bleed steam from the high pressure and intermediate turbines is circulated through heat exchangers 9 and 11 to preheat the combustion air.

OPERATION

Operation of the conventional portions of the system are well known and need not be described in detail. It will be understood that the fuel burnt in the furnace produces heat which is used to produce steam which is separated in the separator 2, superheated in superheater 3 and applied to the high pressure turbine 6. The output from the high pressure turbine flows through the reheater 5 to the intermediate pressure turbine and thence to the low pressure turbines 7 and 8. The various turbines are used to drive machinery as required.

To increase the efficiency of the system, a portion of the steam is bled from the intermediate and high pressure turbines and used to preheat the combustion air and this is the function of heat exchangers 9 and 11. The heat exchange between the bled steam and the combustion air may be deemed 100% efficient. The steam from the low pressure turbines is applied to the main condenser 28 and the condensate output from the condenser is applied through pump 21 to the boiler feed water line 29 which includes the various heat exchangers previously referred to. The various heat exchangers 10, 12, 13, 14 and 15 in the boiler feed water line 29 preheat the feed water before it enters the economizer and increase the efficiency of he system by reclaiming the heat from the various bleeds.

By circulating a portion of the boiler feed water to the air preheater coil 20, the remnant heat in the water from the main condenser can be extracted and used to preheat the air. This cooled water is then circulated through heat exchanger 23 which extracts the remnant heat from the stack gases as does heat exchanger 24. The somewhat warmed feed water is then passed through the second preheat coil 25 which increases the temperature of the combustion air. The feed water is then returned to the feed water line 29 at junction 26 and passed through the normal heat exchangers. The addition of heat exchangers 20, 23, 24 and 25 extracts the remaining heat from the flue gases and add some initial heating to the combustion air.

Because of the low temperature involved, the flue gases produce condensate on the heat exchangers 23 and 24, and it may be necessary to manufacture the heat exchangers out of corrosion resistant materials such as titanium tubing because of the acidic liquids in condensate formed on the surfaces of the heat exchangers. An electrostatic dust precipitator may be used to clean the flue gases and, if used, would be placed between cooling heat exchangers, such as heat exchangers 27 and 24 so that it is not exposed to the condensate.

While only two final air preheater coils 9 and 11 are shown, it will be understood that the number will vary based upon the value of the improved efficiency produced and the cost of suitable heat exchangers.

In most systems, the addition of air preheaters and low temperature stack gas heat extracting coils will improve the overall cycle efficiency about 5% points.

What is claimed is:

1. In a multi-stage steam power plant, a combustion chamber, a steam generator associated with said combustion chamber, a plurality of steam turbine stages including a first high pressure turbine and a last low pressure turbine, means to apply the steam from said steam generator to said steam turbine stages, steam bleeds from at least some of said stages and a condenser for receiving the steam output from said last low pressure turbine and having a water condensate output, a duct for providing combustion air to said combustion chamber and a flue for extracting combustion gases from said combustion chamber, a first steam to air heat exchanger in said duct for transferring a portion of the heat from the steam from at least one of said steam bleeds to the combustion air in said duct, a first water to gas heat exchanger in said duct upstream of said first steam to air heat exchanger for transferring a portion of the heat from said condensate output to the combustion air in said duct, a second water to gas heat exchanger in said flue for transferring a portion of the heat from said combustion gases to the condensate output from said first water to gas heat exchanger and a third water to gas heat exchanger in said duct downstream of said first water to gas heat exchanger for transferring a portion of the heat from the condensate output from said second water to gas heat exchanger to the combustion air in said duct.

2. A multi-stage steam power plant as claimed in claim 1 including a fifth water to gas heat exchanger in said flue upstream of said second water to gas heat exchanger and connected to said steam generator and an injector pump extracting the condensate from said third water to gas heat exchanger and forcing it into said fifth water to gas heat exchanger and thence into said steam generator.

3. In a multi-stage steam power plant as claimed in claim 1, a second steam to air heat exchanger in said duct for transferring a portion of the heat from the steam from a second of said steam bleeds to the combustion air in said duct.

4. A multi-stage steam power plant as claimed in claim 1, a fourth water to gas heat exchanger in said flue located nearer to said combustion chamber than said second water to gas heat exchanger receiving the condensate output from said second water to gas heat exchanger for transferring a portion of the heat from said combustion gases before transmitting said condensate on to said third water to gas heat exchanger.

5. A multi-stage steam power plant as claimed in claim 4 including a fifth water to gas heat exchanger in said flue upstream of said second water to gas heat exchanger and connected to said steam generator and an injector pump extracting the condensate from said third water to gas heat exchanger and forcing it into said fifth water to gas heat exchanger and thence into said steam generator.

* * * * *